(12) United States Patent
McGrath

(10) Patent No.: US 8,302,919 B1
(45) Date of Patent: Nov. 6, 2012

(54) ADJUSTABLE BRACKET ASSEMBLY

(76) Inventor: Andrew H. McGrath, Concord, CA (US)

( * ) Notice: Subject to any disclaimer, the term of this patent is extended or adjusted under 35 U.S.C. 154(b) by 341 days.

(21) Appl. No.: 12/699,602

(22) Filed: Feb. 3, 2010

(51) Int. Cl.
*A47B 96/06* (2006.01)

(52) U.S. Cl. .................... 248/205.1; 248/398; 248/121; 248/515

(58) Field of Classification Search ........................ None
See application file for complete search history.

(56) References Cited

U.S. PATENT DOCUMENTS

| | | |
|---|---|---|
| 54,248 A | 4/1866 | Eddy |
| 147,362 A | 2/1874 | Boudren |
| 255,123 A | 3/1882 | Starrett |
| 257,646 A | 5/1882 | Beseler |
| 342,650 A | 5/1886 | Smith |
| 369,143 A | 8/1887 | White |
| 369,971 A | 9/1887 | Stillman |
| 384,784 A | 6/1888 | Pihl |
| 406,299 A | 7/1889 | Overpack |
| 423,434 A | 3/1890 | Lotto |
| 432,614 A | 7/1890 | Hendrick |
| 462,319 A | 11/1891 | Loehner |
| 476,806 A | 6/1892 | Mauser |
| 502,601 A | 8/1893 | Anderson |
| 546,081 A | 9/1895 | Reyer |
| 551,358 A | 12/1895 | Benecke |
| 554,459 A | 2/1896 | Rockwell |
| 555,025 A | 2/1896 | Ruffhead |
| 557,575 A | 4/1896 | Gibson |
| 560,879 A | 5/1896 | Williams |
| 566,360 A | 8/1896 | White |
| 568,649 A | 9/1896 | Whittington |
| 575,711 A | 1/1897 | Haley |
| 575,857 A | 1/1897 | Sly |
| 576,769 A | 2/1897 | Williams |
| 577,974 A | 3/1897 | Williams |
| 578,014 A | 3/1897 | Homan |
| 581,991 A | 5/1897 | Homan |
| 585,406 A | 6/1897 | Rhind |
| 596,762 A | 1/1898 | Sevison |
| 597,947 A | 1/1898 | Bragger |
| 599,467 A | 2/1898 | Beardsley |
| 600,642 A | 3/1898 | Hartman |
| 621,374 A | 3/1899 | Rhind |
| 625,944 A | 5/1899 | White |
| 632,858 A | 9/1899 | Waibel |
| 642,906 A | 2/1900 | Hedgeland |
| 663,121 A | 12/1900 | Frost |
| 763,380 A | 6/1904 | Eble |
| 767,484 A | 8/1904 | Maltby |

(Continued)

FOREIGN PATENT DOCUMENTS

AU    WO 98/50728 A1    12/1998

*Primary Examiner* — Terrell McKinnon
*Assistant Examiner* — Monica Millner
(74) *Attorney, Agent, or Firm* — Charles L. Thoeming

(57) ABSTRACT

A bracket assembly for adjustably and releasably affixing bracket elements to an elongated support member includes a cylindrical base, a cylindrical core, and a cylindrical cap having an orthogonal arm. The bracket assembly provides adjustable bracket positioning along the elongated support member and 360 degrees about the elongated support member diameter. The orthogonal arm provides additional 360 degree adjustable positioning for any element attached to the arm outward end. Abutting bracket assemblies on an elongated support member provide a range of orthogonal arm positions 180 degrees or less, one to the other.

12 Claims, 3 Drawing Sheets

U.S. PATENT DOCUMENTS

| | | | |
|---|---|---|---|
| 795,602 A | 7/1905 | Fyfe | |
| 842,007 A | 1/1907 | Parker | |
| 842,313 A | 1/1907 | Harrison | |
| 874,435 A | 12/1907 | Prescott | |
| 926,114 A | 6/1909 | Hall | |
| 926,840 A | 7/1909 | Bagaason | |
| 959,099 A | 5/1910 | Anderson | |
| 963,913 A | 7/1910 | Lyhne | |
| 970,751 A | 9/1910 | Pranke | |
| 1,047,817 A | 12/1912 | Knight | |
| 1,056,574 A | 3/1913 | Newton | |
| 1,057,658 A | 4/1913 | Nochols | |
| 1,074,272 A | 9/1913 | Kline | |
| 1,094,272 A | 4/1914 | Thornley | |
| 1,106,486 A | 8/1914 | Becker | |
| 1,132,554 A | 3/1915 | Brett | |
| 1,137,333 A | 4/1915 | Klorer | |
| 1,178,072 A | 4/1916 | Hoag | |
| 1,190,050 A | 7/1916 | Verba | |
| 1,190,502 A | 7/1916 | Anderson | |
| 1,206,871 A | 12/1916 | Locke | |
| 1,217,838 A | 2/1917 | Schmidt | |
| 1,227,258 A | 5/1917 | Godley | |
| 1,231,635 A | 7/1917 | Nelson | |
| 1,244,855 A | 10/1917 | Hess | |
| 1,266,399 A | 5/1918 | Burtis | |
| 1,286,352 A | 12/1918 | Kubat | |
| 1,290,252 A | 1/1919 | Lester | |
| 1,303,249 A | 5/1919 | Brown | |
| 1,303,345 A | 5/1919 | McFeaters | |
| 1,324,456 A | 12/1919 | Lutz | |
| 1,328,930 A | 1/1920 | Stern | |
| 1,345,157 A | 6/1920 | Francisco | |
| 1,346,402 A | 7/1920 | Glaudel | |
| 1,353,552 A | 9/1920 | Sweet | |
| 1,354,873 A | 10/1920 | Bartley | |
| 1,356,213 A | 10/1920 | Loyd | |
| 1,358,159 A | 11/1920 | Kern | |
| 1,358,262 A | 11/1920 | Sumner | |
| 1,358,422 A | 11/1920 | D'esopo | |
| 1,358,792 A | 11/1920 | Shogran | |
| 1,359,645 A | 11/1920 | Zink | |
| 1,371,703 A | 3/1921 | Miller | |
| 1,372,492 A | 3/1921 | Doyle | |
| 1,373,840 A | 4/1921 | Smith | |
| 1,375,888 A | 4/1921 | Baer | |
| 1,385,485 A | 7/1921 | Comrie | |
| 1,386,565 A | 8/1921 | Glaudel | |
| 1,389,053 A | 8/1921 | King | |
| 1,389,901 A | 9/1921 | Rosenbluth | |
| 1,389,935 A | 9/1921 | Carroll | |
| 1,393,158 A | 10/1921 | Pawsat | |
| 1,393,681 A | 10/1921 | Glaudel | |
| 1,399,461 A | 12/1921 | Childs | |
| 1,401,402 A | 12/1921 | Hawthorne | |
| 1,403,863 A | 1/1922 | Peat | |
| 1,408,834 A | 3/1922 | Seavey | |
| 1,412,690 A | 4/1922 | Leuckert | |
| 1,453,685 A | 4/1922 | Longenbaugh | |
| 1,430,379 A | 9/1922 | Hubbell | |
| 1,434,714 A | 11/1922 | McMullen | |
| 1,435,310 A | 11/1922 | Kipper | |
| 1,503,638 A | 1/1923 | Cooper | |
| 1,454,390 A | 5/1923 | Loranger | |
| 1,460,313 A | 6/1923 | Davis | |
| 1,461,289 A | 7/1923 | Primrose | |
| 1,461,398 A | 7/1923 | McMullen | |
| 1,465,213 A | 8/1923 | Feinberg | |
| 1,527,998 A | 9/1923 | Serpico | |
| 1,470,553 A | 10/1923 | Church | |
| 1,488,986 A | 4/1924 | Hood | |
| 1,489,934 A | 4/1924 | Eklund | |
| 1,490,304 A | 4/1924 | Zink | |
| 1,493,609 A | 5/1924 | Dailey | |
| 1,494,033 A | 5/1924 | Stevens | |
| 1,504,767 A | 8/1924 | Hodny | |
| 1,512,591 A | 10/1924 | McGuire | |
| 1,515,867 A | 11/1924 | Masone | |
| 1,522,476 A | 1/1925 | Albright | |
| 1,538,340 A | 5/1925 | Hodny | |
| 1,547,794 A | 7/1925 | Curry | |
| 1,558,641 A | 10/1925 | Short | |
| 1,574,899 A | 3/1926 | Kellogg | |
| 1,580,316 A | 4/1926 | Moreton | |
| 1,590,562 A | 6/1926 | Blonigen | |
| 1,597,943 A | 8/1926 | Wilhelm | |
| 1,706,215 A | 3/1929 | Davidson | |
| 1,721,271 A | 7/1929 | Du Prel | |
| 1,732,534 A | 10/1929 | Riches | |
| 1,735,212 A | 11/1929 | Pawsat | |
| 1,737,214 A | 11/1929 | Brown | |
| 1,745,695 A | 2/1930 | Hunter | |
| 1,989,691 A | 11/1930 | Hirt | |
| 1,793,911 A | 2/1931 | Dann | |
| 1,814,500 A | 7/1931 | Summerbell | |
| 1,835,473 A | 12/1931 | Davidson | |
| 1,849,001 A | 3/1932 | Fisher | |
| 1,936,529 A | 6/1932 | Taylor | |
| 2,010,058 A | 6/1932 | Carlson | |
| 1,941,032 A | 12/1933 | Knowles | |
| 2,073,089 A | 3/1935 | Autenrieth | |
| 2,038,906 A | 4/1936 | Ruhland | |
| 2,066,699 A | 1/1937 | Skelton | |
| 2,074,247 A | 3/1937 | Armstrong | |
| 2,124,006 A | 7/1938 | Parker | |
| 2,163,859 A | 6/1939 | Ver Bockel | |
| 2,177,921 A | 10/1939 | Zofrey | |
| 2,220,429 A | 11/1940 | Scderberg | |
| 2,315,132 A | 4/1941 | Powers | |
| 2,290,874 A | 6/1941 | Graff | |
| 2,258,175 A | 11/1941 | Coleman | |
| 2,287,890 A | 6/1942 | Legassey | |
| 2,370,748 A | 4/1943 | O'Donnell | |
| 2,338,124 A | 1/1944 | Martinek | |
| 2,365,935 A | 12/1944 | Boggs | |
| 2,433,550 A | 9/1945 | Graham | |
| 2,456,505 A | 12/1948 | Hastings | |
| 2,635,345 A | 1/1949 | Samborski | |
| 2,511,590 A | 6/1950 | Keck | |
| 2,548,650 A | 4/1951 | Brandt | |
| 2,567,593 A | 9/1951 | Bemis | |
| 2,596,627 A | 5/1952 | Wahnish | |
| 2,696,996 A | 7/1952 | Engelhardt | |
| 2,651,725 A | 9/1953 | McFarland | |
| 2,719,691 A | 10/1955 | Vance | |
| 2,733,035 A | 1/1956 | Rocheleau | |
| 2,767,003 A | 10/1956 | Gilmont | |
| 2,783,015 A | 2/1957 | Kampa | |
| 3,026,162 A | 4/1960 | Waszkiewicz | |
| 2,970,798 A | 2/1961 | Fritchle | |
| 3,003,813 A | 10/1961 | Bolenbach | |
| 3,069,189 A | 12/1962 | Hollaender | |
| 3,073,660 A | 1/1963 | Schultz | |
| 3,096,109 A | 7/1963 | Callahan | |
| 3,118,695 A | 1/1964 | Engelhardt | |
| 3,126,191 A | 3/1964 | Holden | |
| 3,216,100 A | 3/1964 | Christensen | |
| 3,160,349 A | 12/1964 | Kent | |
| 3,237,899 A | 3/1966 | Lewis | |
| 3,265,434 A | 8/1966 | Bolotin | |
| 3,269,683 A | 8/1966 | Shinaver | |
| D206,162 S | 11/1966 | Molitor | |
| D206,198 S | 11/1966 | Molitor | |
| 3,389,882 A | 6/1968 | Schlosser | |
| 3,405,587 A | 10/1968 | Meazzi | |
| 3,610,562 A | 10/1969 | Holmes et al. | |
| 3,484,066 A | 12/1969 | Aunspaugh | |
| 3,499,697 A | 3/1970 | Olander | |
| 3,500,594 A | 3/1970 | O'Brien | |
| 3,543,312 A * | 12/1970 | Giancarlo | 108/49 |
| 3,581,354 A | 6/1971 | Usiskin | |
| 3,640,498 A | 2/1972 | Aleks | |
| 3,734,439 A | 5/1973 | Wintz | |
| 3,738,606 A | 6/1973 | Millen | |
| 3,837,383 A | 9/1974 | Ko | |
| 3,843,083 A | 10/1974 | Angibaud | |
| 4,047,684 A | 9/1977 | Kobayashi | |

| | | |
|---|---|---|
| 4,050,661 A | 9/1977 | Wooldridge |
| 4,115,966 A | 9/1978 | DeLee |
| 4,126,081 A | 11/1978 | Zdeb |
| 4,132,178 A | 1/1979 | Mueller et al. |
| 4,162,647 A | 7/1979 | Aslen |
| 4,237,798 A | 12/1980 | Welsch et al. |
| 4,307,864 A | 12/1981 | Benoit |
| 4,338,875 A | 7/1982 | Lisowski |
| 4,443,128 A | 4/1984 | Yamamoto |
| 4,452,416 A | 6/1984 | Templeton |
| 4,483,334 A | 11/1984 | Murray |
| 4,511,158 A | 4/1985 | Varga |
| 4,547,092 A | 10/1985 | Vetter |
| 4,624,374 A | 11/1986 | Murtaugh |
| 4,729,535 A | 3/1988 | Frazier |
| 4,747,569 A | 5/1988 | Hoshino |
| 4,799,444 A | 1/1989 | Lisowski |
| 4,799,818 A | 1/1989 | Sudimak et al. |
| 4,821,382 A | 4/1989 | Puschkarski |
| 4,884,927 A | 12/1989 | Menker |
| 4,892,366 A | 1/1990 | Yerman |
| D309,540 S | 7/1990 | Settles et al. |
| 4,964,603 A | 10/1990 | Yair |
| 4,976,486 A | 12/1990 | Rifaat |
| 5,002,247 A | 3/1991 | Dispenza et al. |
| 5,023,755 A | 6/1991 | Rosenberg |
| 5,056,854 A | 10/1991 | Rosen |
| 5,082,334 A | 1/1992 | Beyer et al. |
| 5,111,956 A | 5/1992 | Jow |
| 5,128,838 A | 7/1992 | Brandess |
| D330,555 S | 10/1992 | Lilly |
| D332,497 S | 1/1993 | Shufelt |
| 5,199,680 A | 4/1993 | Rivera |
| D337,462 S | 7/1993 | LaVaute et al. |
| 5,259,582 A | 11/1993 | DeLange |
| 5,409,122 A | 4/1995 | Lazarus |
| 5,449,138 A | 9/1995 | Ciancio |
| 5,566,911 A | 10/1996 | Hoshino |
| 5,584,545 A | 12/1996 | LaVaute et al. |
| 5,589,903 A | 12/1996 | Speggiorin |
| D377,429 S | 1/1997 | Olson |
| 5,681,017 A | 10/1997 | Clausen |
| 5,704,232 A | 1/1998 | Kuo |
| 5,704,581 A * | 1/1998 | Chen .............................. 248/371 |
| 5,735,499 A | 4/1998 | Phillips |
| 5,746,334 A | 5/1998 | Brandenberg |
| 5,775,652 A | 7/1998 | Crawshaw |
| 5,823,102 A | 10/1998 | Will |
| 5,826,850 A | 10/1998 | Goldsmith |
| 5,887,314 A * | 3/1999 | Jordan, Jr. ....................... 16/405 |
| 5,974,984 A | 11/1999 | Mitjans |
| 6,010,017 A * | 1/2000 | Michaelis et al. ......... 211/133.4 |
| 6,093,878 A | 7/2000 | Hoshino |
| 6,132,018 A | 10/2000 | McGrath |
| 6,328,269 B1 | 12/2001 | Krautloher |
| 6,588,863 B1 * | 7/2003 | Yatchak et al. ............. 312/140.4 |
| 7,458,475 B2 * | 12/2008 | Ho ................ 211/85.23 |
| D625,170 S | 10/2010 | McGrath |
| D625,984 S | 10/2010 | McGrath |
| D636,658 S | 4/2011 | McGrath |
| 2007/0236112 A1* | 10/2007 | Williman ................... 312/140.4 |

* cited by examiner

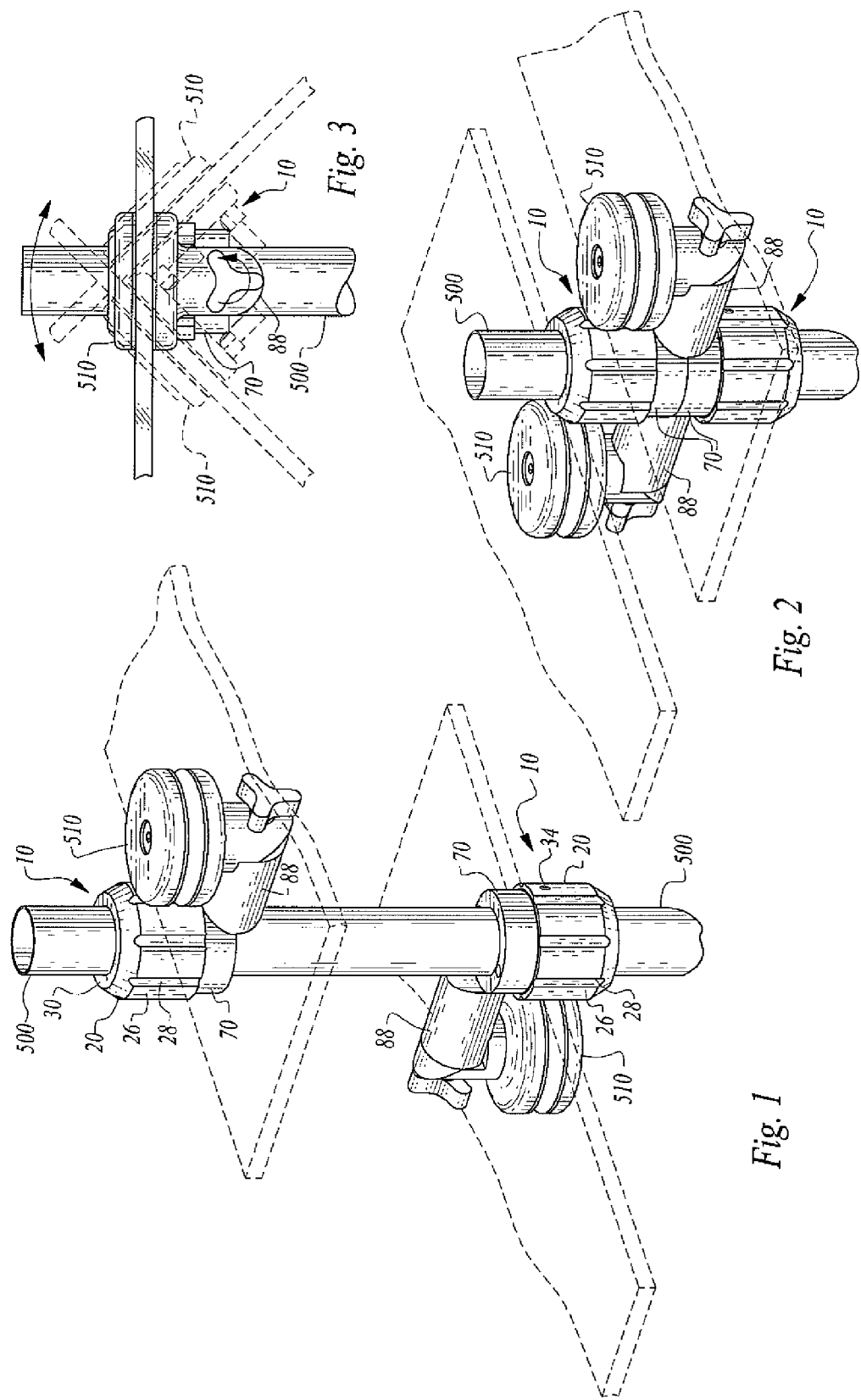

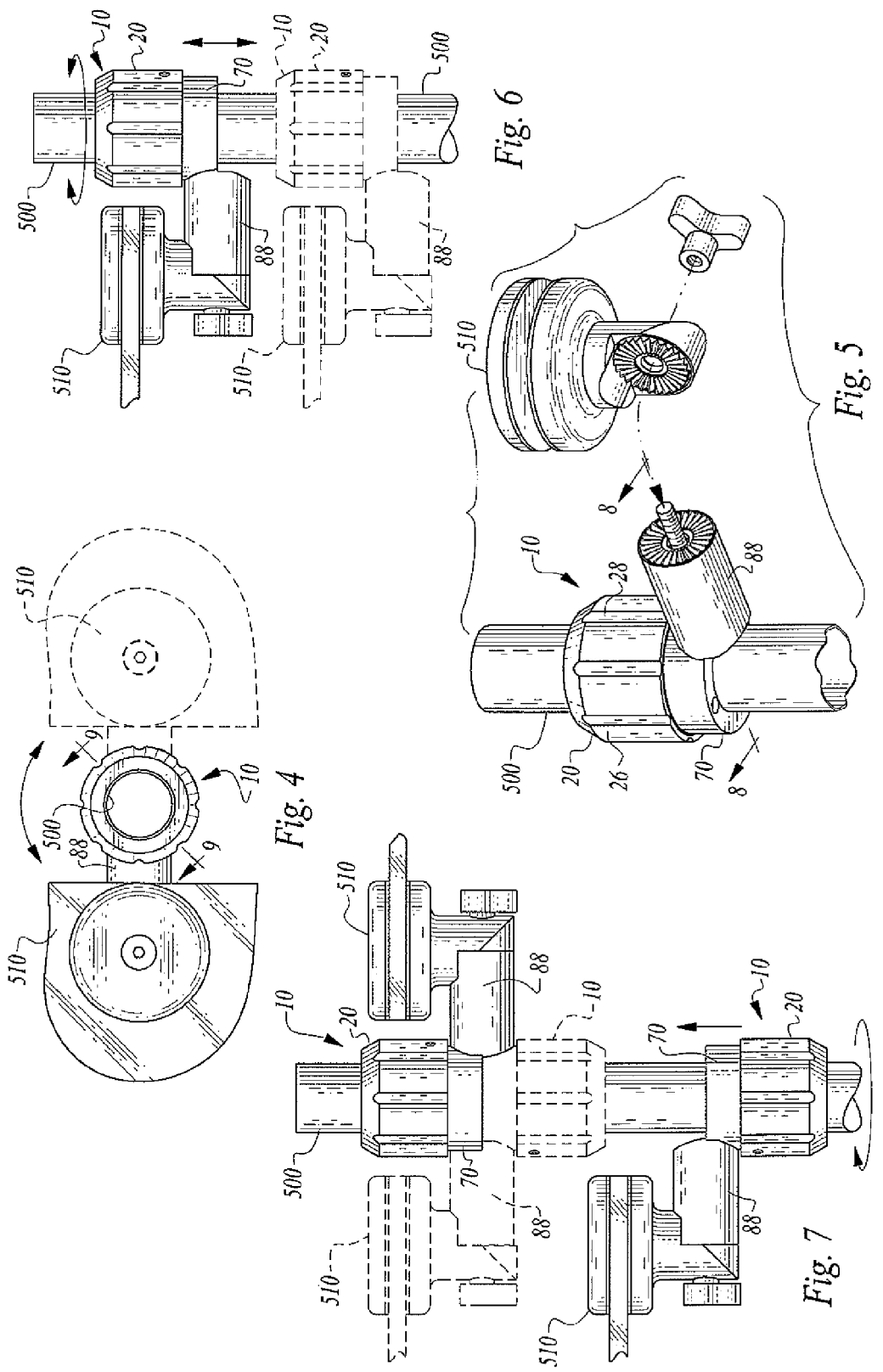

ADJUSTABLE BRACKET ASSEMBLY

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to ready-to-assemble components used in adjustable bracket assemblies for adapting to and connecting one or more substantially external support member(s) defined by the particular utility of the overall assembly to a fixed support structure. Such ready-to-assemble components can be typically, but not exclusively, employed to releasably affix a plurality bracket elements to an elongated support member.

BACKGROUND OF THE INVENTION

Adjustable height supports and bracketing are well known in the art and typically comprise an upright or support member, some separate assembly for supporting a platform or similar assembly, apparatus for moving the separate assembly along or around the elongated support member, and an assembly for securing the elongated support member.

Designing and assembling these elements is ordinarily complicated since dimensions, load factors, code requirements, and aesthetics converge to present brackets which are labor and component intensive. Often bracketing assemblies will have many component parts and require several tools for assembly. Moreover, with current technology, bracket assembly or positional adjustment of an assembled bracket requires more than one person and is time consuming.

Many ready to assemble bracket assemblies utilize location dependent uprights or support members that multiply the effort needed to design and assembly the bracketing components and that intensify the complexity of the process. Presently most bracketing assemblies are installed by the seller because of the complexity of assembling. Thus, many bracketing assemblies are handled fully or most fully assembled which presents bulky cargo that takes up considerable amount of space and is difficult to transport.

Additionally, when one part of a piece of bracketing assembly is damaged, often the entire product must be returned instead of the damaged part. For example, when an upright or support member fails or is defective, often the entire bracketing assembly must be replaced.

Finally, the bracket assembly needs to be supported by adequate and aesthetically pleasing attachment components for securing the assembly to one or more fixed support structures.

DISCLOSURE OF INVENTION

The present invention relates to adjustable bracketing assemblies that can be employed readily over a wide array of bracketing applications to securely connect a variety of bracket elements to an elongated support member, while still satisfying the complement of requirements presented by dimensions, load factors, codes, and design preferences. Furthermore, the bracketing apparatus disclosed and claimed herein has been fashioned in such a manner as to maximize its utility over a broad range of applications, while minimizing the labor, parts and tools required for implementation. Since the apparatus is characterized by its universality and relative simplicity and ease of installation, it serves to fulfill both original and retrofit bracketing applications. The multiple adjustment features of the apparatus require less "design customizing" for a given installation, thus providing demonstrable cost savings.

The adjustable bracketing assembly includes connector apparatus for mounting and securing bracket elements to at least one elongated support member, and allowing for positional adjustment of the elements along the elongated support member longitudinal axis, or around a fixed position on the elongated support member.

The adjustable bracketing assembly provides a cylindrical base portion having an internally threaded portion sized to receive and hold a threaded and slotted cylindrical core having an internal diameter sized to receive and affix to an elongated support member. A cap portion is sized to fit on top of the slotted cylindrical core, and be affixed thereto by at least one fastener. The cap portion has an arm orthogonally disposed to the cylindrical core/base assembly. The arm has at least one fastener assembly at the outward arm end for attachment of bracketing hardware as defined by the bracketing application.

Other features, advantages, and objects of the bracket assembly will become apparent with reference to the following description and accompanying drawings.

BRIEF DESCRIPTION OF DRAWINGS

FIG. 1 is a perspective view of an embodiment of bracket assemblies 10 positioned on an elongated support member 500 and having rotatably attached elements 510 on each orthogonally affixed arm second end 92.

FIG. 2 is a perspective view of an embodiment of bracket assemblies 10 positioned on an elongated support member 500 with positioned abutting cylindrical caps 70 to allow arms affixed to cylindrical cap portion orthogonally disposed to the central longitudinal axis 88 to receive bracketing hardware in each respective rotatably attached element 510 on each orthogonally affixed arm second end 92 whereby the bracketing hardware is configured along a contiguous plane on either side of the elongated support member 500.

FIG. 3 is an elevation view of an embodiment of bracket assembly 10 depicting a portion of the 360 degree range of motion and positions for a rotatably attached element 510 on the second end 92 of orthogonally affixed arm 88.

FIG. 4 is a top planar view of an embodiment of bracket assembly 10 of FIG. 1 depicting a portion of the 360 degree range of motion and positions for a rotatably attached element 510 on the orthogonally affixed arm second end 92 about a common locus of points around the outside diameter of the elongated support member 500.

FIG. 5 is an exploded perspective view of an embodiment of bracket assembly 10 of FIG. 1 depicting the 360 degree rotatably attached element 510 on the second end 92 of orthogonally affixed arm 88.

FIG. 6 is an elevation view of an embodiment of bracket assembly 10 of FIG. 1 depicting a portion of the vertical and 360 degree rotational range of motion and positions for the bracket assembly 10 and the cylindrical base external surface longitudinal gripping notches 28 along and about the elongated support member 500.

FIG. 7 is an elevation view of an embodiment of bracket assemblies 10 of FIG. 1 depicting how two bracket assemblies 10 can be positioned with abutting cylindrical caps 70 to provide bracketing hardware in each respective rotatably attached element 510 on the second end 92 of orthogonally affixed arm 88 in the contiguous plane of FIG. 2 on either side of the elongated support member 500.

MODES FOR CARRYING OUT THE INVENTION

Figure 8:
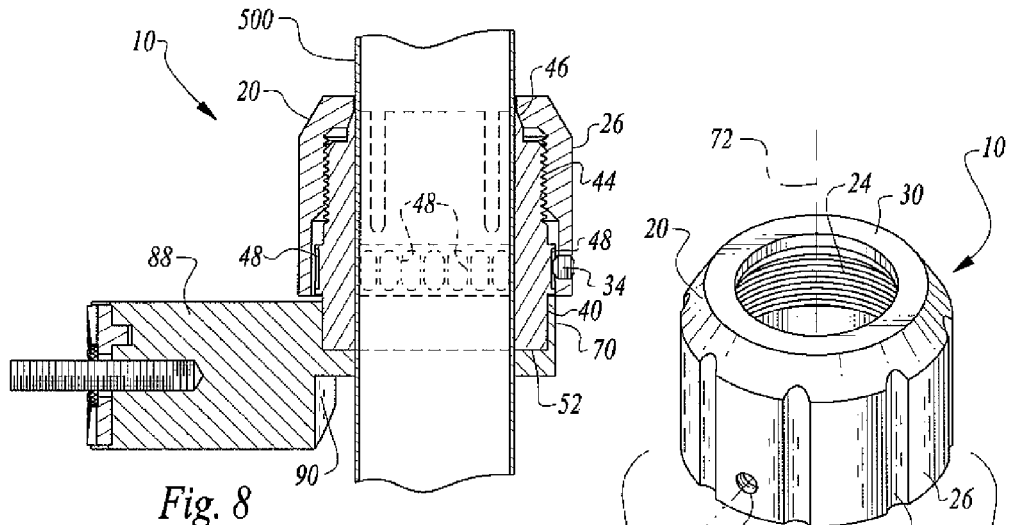
FIG. 8 is a section view of the bracket assembly 10 of FIG. 5 taken at "8-8."
Figure 9:
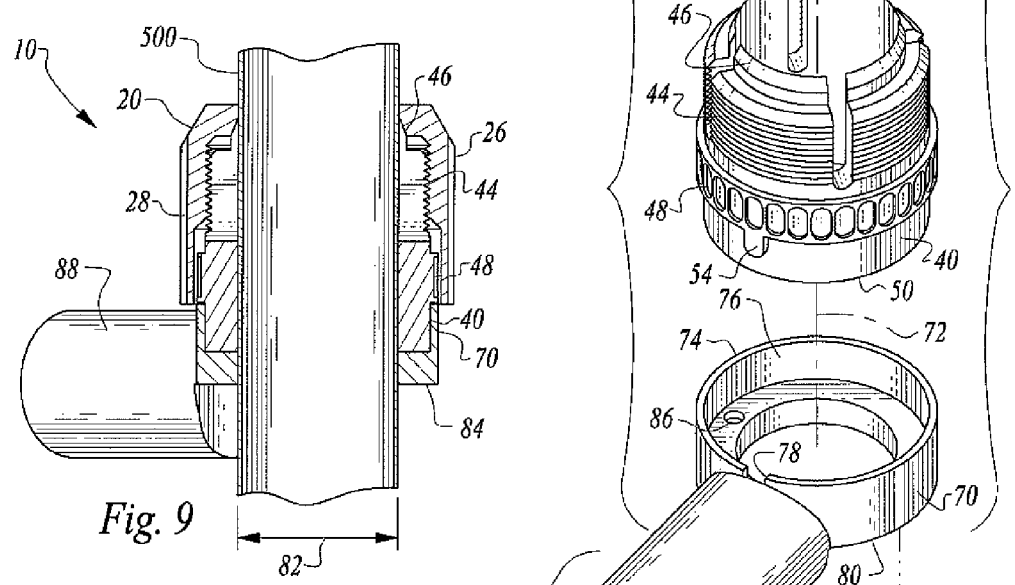
FIG. 9 is a section view of the bracket assembly 10 of FIG. 4 taken at "9-9."
Figure 10:
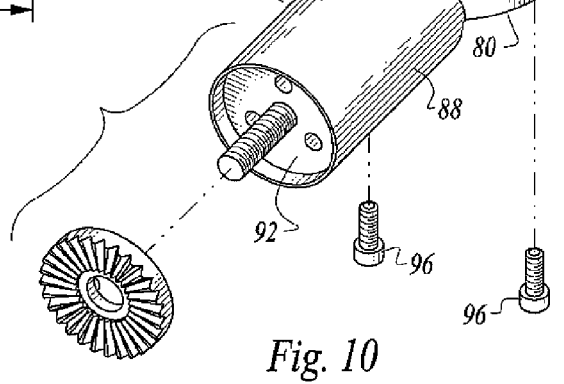
FIG. 10 is an exploded bracket assembly 10 depicting the cylindrical base 20, cylindrical core 40, and the cylindrical cap 70, and selected elements for each of the bracket assemblies of FIGS. 1-9.

Referring now to FIGS. 1-10, a cylindrical base 20, a cylindrical core 40, and a cylindrical cap portion 70 are provided for an embodiment of bracket assembly 10

The bracket assembly 10 includes a cylindrical base 20 having: a cylindrical base central longitudinal axis 22; a cylindrical base internally threaded portion 24; a cylindrical base larger diameter open end 26; cylindrical base external surface longitudinal gripping notches 28; a cylindrical base mitered end 30; and a cylindrical base threaded opening 32 to correspond with a cylindrical core circumferential locking element band 48; and at least one threaded fastener 34 for securing the cylindrical base 20 to the cylindrical core circumferential locking element band 48 through the cylindrical base threaded opening 32.

The bracket assembly 10 further includes a cylindrical core 40 having: a cylindrical core central longitudinal axis 42; a cylindrical core externally threaded, compression flange element end 44; a cylindrical core externally threaded, compression flange element end tapered and mitered end 46; a cylindrical core circumferential locking element band 48; a cylindrical core cylindrical open end 50; a cylindrical core cylindrical open end flat circular top surface 52; a cylindrical core cylindrical open end longitudinally disposed external tongue 54; and at least one cylindrical core threaded opening positioned in the cylindrical open end flat circular top surface 56 orthogonal to the cylindrical open end flat circular top surface 56.

The bracket assembly 10 further includes a cylindrical cap 70 having: a cylindrical cap central longitudinal axis 72; cylindrical cap first end 74; a cylindrical cap first end circular diameter 76; a cylindrical cap first end circular diameter longitudinally disposed internal groove 78; a cylindrical cap second end 80; a cylindrical cap portion second end circular diameter 82; a cylindrical cap second end flat circular top surface 84; a cylindrical cap second end flat circular top surface flush mount opening 86 orthogonal to the second end flat circular top surface flush mount opening 86; an arm affixed to cylindrical cap portion orthogonally disposed to the central longitudinal axis 88; an orthogonally affixed arm first end 90; and an orthogonally affixed arm second end 92.

The cylindrical core 40 is sized to fit into the cylindrical base 20 by the cylindrical core externally threaded, compression flange element end 44 being threaded into the cylindrical base internally threaded portion 24. Once the cylindrical core 40 is threaded into the cylindrical base 20, the cylindrical base central longitudinal axis 22 and the cylindrical core central longitudinal axis 42 are uniformly overlapped.

The cylindrical cap 70 is sized to fit onto the cylindrical core 40 by the cylindrical cap first end 74 receiving the cylindrical core cylindrical open end flat circular top surface 52 in the cylindrical cap first end circular diameter 76. Alignment of the cylindrical cap 70 and the cylindrical core 40 is positioned by the cylindrical core cylindrical open end longitudinally disposed external tongue 54 fitting into and being received by the cylindrical cap first end circular diameter longitudinally disposed internal groove 78.

The cylindrical cap 70 is secured to the cylindrical core 40 by fasteners 96 through each cylindrical cap second end flat circular top surface flush mount opening 86 and into each cylindrical core threaded opening in the cylindrical open end flat circular top surface 56. Once the cylindrical core 40 is received into and secured by the cylindrical cap 70, the cylindrical base central longitudinal axis 22 and the cylindrical cap central longitudinal axis 72 are uniformly overlapped.

The assembled bracket assembly 10 can receive the elongated support member 500 from either the cylindrical base 20 or the cylindrical cap 70, since both the cylindrical base opening 32 and corresponding cylindrical core externally threaded, compression flange element end tapered and mitered end 46 and the cylindrical cap portion second end circular diameter 82 have equally sized diameters corresponding to the diameter of the elongated support member 500. In this manner, at least two bracket assemblies 10 can be positioned with abutting cylindrical caps 70 to allow arms affixed to cylindrical cap portion and orthogonally disposed to the cap portion central longitudinal axis 88 to receive bracketing hardware in each respective rotatably attached element 510 on each orthogonally affixed arm second end 92 using any of the connection members from my U.S. Pat. No. 6,132,018 (the "'018 patent") (FIGS. 11-13 of the '018 patent) which are incorporated by reference as if fully set forth herein, in the orthogonally affixed arm second end 92. For the preferred embodiment of a bracket assembly for sneezeguard applications, FIGS. 2 and 3, this alignment feature of the bracket assembly provides an assembly that can easily and readily adjust vertically and rotatably 360 degrees with respect to the elongated support member 500, while also providing 360 degree positional adjustment for any bracketing hardware. In this illustrated embodiment, the bracketing hardware is a sneezeguard glass element, affixed to the bracket assembly. As also depicted in FIG. 2, the preferred embodiment of bracket assembly also allows assembly of sneezeguard glass elements at equal height and angular adjustment to provide, as one possible assembly, sneezeguard glass protection in a continuous plane extending on either side of the elongated support member 500. Similarly, the rotatably attached element 510 on each orthogonally affixed arm second end 92 may be positioned at any angle less than 180 degrees from the companion rotatably attached element 510 for bracket assemblies 10 abutting cylindrical caps 70 on an elongated support member 500.

Once positioned on the elongated support member 500, the assembled bracket assembly 10 can readily and simply be repositioned upwards or downwards or rotationally on the elongated support member 500 by operating the cylindrical base 20 in a counterclockwise position relative to the cylindrical core externally threaded, compression flange element end 44, FIGS. 4-7, 10. Once the assembled bracket assembly 10 is in the desired position relative to the length of the elongated support member 500, the bracket assembly 10 is tightened onto the elongated support member 500 in the desired position by operating the cylindrical base 20 in a clockwise position relative to the cylindrical core externally threaded, compression flange element end 44. The cylindrical base 20 can then be locked into the tightened rotational position relative to the cylindrical core 40 by threaded fastener 34 through the cylindrical base threaded opening 32 corresponding with a position on the cylindrical core circumferential locking element band 48. Rotational operation of the cylindrical base 20 is enhanced by a plurality of cylindrical base external surface longitudinal gripping notches 28. Similarly, the rotatably attached element 510 on one orthogonally affixed arm second end 92 may be positioned at any angle 180 degrees or less from the companion rotatably attached element 510 on a second orthogonally affixed arm second end 92 for bracket assemblies 10 having abutting cylindrical caps 70 on an elongated support member 500, FIGS. 1-7. This range of bracket assembly 10 positional arrangement provides the ability to meet a multitude of design and utility requirements quickly, easily and with a minimum number of components.

Anyone of a number of different bracket hardware rotatable elements 510 may be fitted onto each cylindrical cap 70 orthogonally affixed arm second end 92 by the attachment assemblies described in my '018 patent, which are incorporated by reference as if fully set forth herein, according to the desired utility of the overall bracketing hardware application.

The cylindrical base 20 and the cylindrical cap 70 are separate, unitary pieces preferably made of a strong metal such as aluminum or steel, or high strength carbon materials such as carbon fiber and carbon fiber-reinforced polymer. The cylindrical core 40 is a separate, unitary piece preferably made of an advanced plastic, polyvinyl chloride, Teflon®, or high strength carbon materials such as carbon fiber and carbon fiber-reinforced polymer.

Therefore, the foregoing is considered as illustrative only of the principles of the bracket assembly. Additionally, since numerous modifications and changes will readily occur to those skilled in the art, it is not desired to limit the bracket assembly to the exact construction and operation shown and described, and further, all suitable modifications and equivalents may be resorted to, falling within the scope of the bracket assembly.

I claim:

1. A bracket assembly comprising, in combination:
   a) a cylindrical base portion comprising a height, a central longitudinal axis, an internally threaded portion opened to a slightly larger diameter open end, an external surface comprising a plurality of longitudinal gripping notches, a cylindrical base threaded opening and threaded fastener orthogonally disposed to the central longitudinal axis, and a mitered end;
   b) a cylindrical core comprising a central longitudinal axis, an externally threaded, compression flange element end comprising a tapered and mitered end sized to receive an elongated support member along the cylindrical core central longitudinal axis and correspond to the cylindrical base internally threaded portion and open end, a circumferential locking element band comprising a plurality of equal sized indents spaced evenly around a locking element band external circumferential surface, the locking element band sized to correspond to the cylindrical base portion open end such that the cylindrical base threaded fastener is selectively received into one of the circumferential locking band equal sized indents locking the position of the cylindrical core to the cylindrical base, and a cylindrical core open end comprising a longitudinally disposed external tongue, a flat circular top surface and at least one threaded opening orthogonally positioned to the flat circular top surface; and
   c) a cylindrical cap comprising a central longitudinal axis, an first end comprising a circular diameter with a longitudinally disposed internal groove sized to receive and secure the cylindrical core cylindrical open end and longitudinally disposed external tongue, a second end comprising a circular diameter smaller than the first end and sized to receive the elongated support member along the cylindrical cap central longitudinal axis, a flat circular top second end surface with at least one orthogonally flush mount opening in the second end flat circular top surface to receive a fastener corresponding to the orthogonally threaded opening in the cylindrical core flat circular top surface to secure the cylindrical cap to the cylindrical core, and an arm comprising first and second ends, the arm first end affixed to the flat circular top second end surface such that the arm is orthogonal to the cylindrical cap central longitudinal axis.

2. The bracket assembly according to claim 1, wherein the cylindrical cap arm second end surface comprises rotatable fastener means for receiving a fixture element.

3. The bracket assembly according to claim 1, wherein the cylindrical base and the cylindrical cap are separate, unitary pieces comprising materials selected from the group consisting of aluminum, steel, or high strength carbon materials such as carbon fiber and carbon fiber-reinforced polymers.

4. The bracket assembly according to claim 1, wherein the cylindrical core is a separate, unitary piece comprising materials selected from the group consisting of an advanced plastic, polyvinyl chloride, Teflon®, or high strength carbon materials such as carbon fiber and carbon fiber-reinforced polymer.

5. Bracket assembly comprising, in combination:
   a) mounting means for mounting the bracket assembly on an elongated support member; and
   b) adjustable connector means disposed an end of the bracket assembly for adjustably and positionally connecting the bracket assembly to the elongated support member and allowing vertical and rotational movement of the bracket assembly relative to the elongated support member so that the bracket assembly and any attached elements thereto may be selectively alternatively positioned in a plurality of angular orientations relative to the elongated support member,
   wherein mounting means for mounting the bracket assembly on an elongated support member and adjustable connector means disposed an end of the bracket assembly for adjustably and positionally connecting the bracket assembly to the elongated support member and allowing vertical and rotational movement of the bracket assembly relative to the elongated support member so that the bracket assembly and any attached elements thereto may be selectively alternatively positioned in a plurality of angular orientations relative to the elongated support member comprise:
   a) a cylindrical base portion comprising a height, a central longitudinal axis, an internally threaded portion opened to a slightly larger diameter open end, an external surface having a plurality of longitudinal gripping notches, a cylindrical base threaded opening and threaded fastener orthogonally disposed to the central longitudinal axis, and a mitered end; and
   b) a cylindrical core comprising a central longitudinal axis, an externally threaded, compression flange element end with a tapered and mitered end sized to receive the elongated support member along the cylindrical core central longitudinal axis and correspond to the cylindrical base internally threaded portion and open end, and a circumferential locking element band comprising a plurality of equal sized indents spaced evenly around a locking element band external circumferential surface, the locking element band sized to correspond to the cylindrical base portion open end such that the cylindrical base threaded fastener is selectively received into one of the circumferential locking band equal sized indents locking the position of the cylindrical core to the cylindrical base.

6. The bracket assembly of claim 5, wherein mounting means for mounting the bracket assembly on an elongated support member and adjustable connector means disposed an end of the bracket assembly for adjustably and positionally connecting the bracket assembly to the elongated support member and allowing vertical and rotational movement of the bracket assembly relative to the elongated support member so that the bracket assembly and any attached elements thereto may be selectively alternatively positioned in a plurality of angular orientations relative to the elongated support member comprise:
 a) a cylindrical base portion comprising a height, a central longitudinal axis, an internally threaded portion opened to a slightly larger diameter open end, an external surface having a plurality of longitudinal gripping notches, and a mitered end; and
 b) a cylindrical core comprising a central longitudinal axis, an externally threaded, compression flange element end with a tapered and mitered end sized to receive the elongated support member along the cylindrical core central longitudinal axis and correspond to the cylindrical base internally threaded portion and open end, a circumferential locking element band sized to correspond to the cylindrical base portion open end.

7. The bracket assembly of claim 6, further comprising a cylindrical cap comprising a central longitudinal axis, an first end comprising a circular diameter sized to receive and secure the cylindrical core cylindrical open end, a second end comprising a circular diameter smaller than the first end portion sized to receive the elongated support member along the cylindrical cap portion central longitudinal axis, a flat circular top second end surface, and an arm comprising first and second ends affixed to the flat circular top second end surface such that the arm is orthogonal to the cylindrical cap central longitudinal axis.

8. The bracket assembly of claim 6, wherein the cylindrical core further comprises a cylindrical open end having a longitudinally disposed external tongue, a flat circular top surface and at least one threaded opening orthogonally positioned to the flat circular top surface.

9. The bracket assembly of claim 8, wherein the cylindrical cap first end circular diameter further comprises a longitudinally disposed internal groove sized to receive and secure the cylindrical core cylindrical open end and longitudinally disposed external tongue to secure the cylindrical cap portion to the cylindrical core.

10. The bracket assembly according to claim 9, wherein the cylindrical base and the cylindrical cap are separate, unitary pieces comprising materials selected from the group consisting of aluminum, steel, or high strength carbon materials such as carbon fiber and carbon fiber-reinforced polymers.

11. The bracket assembly according to claim 9, wherein the cylindrical core is a separate, unitary piece comprising materials selected from the group consisting of an advanced plastic, polyvinyl chloride, Teflon®, or high strength carbon materials such as carbon fiber and carbon fiber-reinforced polymer.

12. A bracket assembly comprising, in combination:
 a) a separate, unitary cylindrical aluminum base comprising a height, a central longitudinal axis, an internally threaded portion opened to a slightly larger diameter open end comprising exterior and interior surfaces, a threaded opening in the open end exterior surface connecting to the open end interior surface, a plurality of longitudinal gripping notches on the open end external surface, a mitered end, and a threaded fastener sized to fit the open end exterior surface threaded opening;
 b) a separate, unitary cylindrical Teflon® core comprising a central longitudinal axis, an externally threaded, compression flange element end with a tapered and mitered end sized to receive an elongated support member along the cylindrical core central longitudinal axis and correspond to the cylindrical base internally threaded portion and open end, a circumferential locking element band comprising a plurality of equal sized indents spaced evenly around a locking element band external circumferential surface, the locking element band sized to correspond to the cylindrical base portion open end such that the cylindrical base threaded fastener is selectively received into one of the circumferential locking band equal sized indents locking the position of the cylindrical core to the cylindrical base, and a cylindrical open end comprising a longitudinally disposed external tongue, a flat circular top surface and at least one threaded opening orthogonally positioned to the flat circular top surface; and
 c) a separate, unitary cylindrical aluminum cap comprising a central longitudinal axis, a first end comprising a circular diameter with a longitudinally disposed internal groove sized to receive and secure the cylindrical Teflon® core cylindrical open end and longitudinally disposed external tongue, a second end comprising a circular diameter smaller than the first end and sized to receive the elongated support member along the cylindrical aluminum cap central longitudinal axis, a flat circular top second end surface with at least one orthogonally flush mount opening in the second end flat circular top surface to receive a fastener corresponding to the orthogonally threaded opening in the cylindrical Teflon® core flat circular top surface to secure the cylindrical aluminum cap to the cylindrical Teflon® core, an arm having first and second ends, the arm first end affixed to the flat circular top second end surface such that the arm is orthogonal to the cylindrical aluminum cap central longitudinal axis, and rotatable fastener means disposed on the arm second end for receiving a fixture element.

* * * * *